Sept. 23, 1958  E. J. MARTIN  2,852,850
METHOD AND APPARATUS FOR THICKNESS MEASUREMENT
Filed Dec. 6, 1955  2 Sheets-Sheet 1

INVENTOR
Edward J. Martin
BY
E. W. Christen
ATTORNEY

Sept. 23, 1958  E. J. MARTIN  2,852,850
METHOD AND APPARATUS FOR THICKNESS MEASUREMENT
Filed Dec. 6, 1955  2 Sheets-Sheet 2

Inventor
Edward J. Martin
By E. W. Christen
Attorney ited States Patent Office 2,852,850
Patented Sept. 23, 1958

2,852,850

METHOD AND APPARATUS FOR THICKNESS MEASUREMENT

Edward J. Martin, Pleasant Ridge, Mich., assignor to General Motors Corporation, Detroit, Mich., a corporation of Delaware Application December 6, 1955, Serial No. 551,395

10 Claims. (Cl. 33—172)

This invention relates to method and apparatus for thickness measurement and more particularly for measurement of the thickness of an overlay material disposed upon a base material.

In many applications, in production or experimental work, it is often necessary or desired to ascertain the thickness of one or more layers of a laminated article. A prime example is found in the manufacture of plain bearings of the type constructed of a base metal with plural layers of bearing metal superposed upon the surface. In such constructions, the thickness of the overlay or bearing metals is of great importance from the standpoint of performance and production. The thickness of such bearing materials is of small magnitude and may vary from a few ten thousandths of an inch upwardly. It is, of course, desirable to obtain a thickness measurement with great accuracy without destruction of the article. It is furthermore desirable to ascertain the thickness by direct measurement and to perform the measurement with great rapidity. These features of thickness measurement are also desirable in many other applications concerned with the fabrication or testing of laminated articles.

Accordingly, it is an object of this invention to provide a method and apparatus for direct measurement of the thickness of an overlay material on a base material with a minimum of disturbance of the material.

A further object of the invention is to provide a substantially non-destructive method and apparatus for ascertaining the thickness of a material.

An additional object of the invention is to provide a method and apparatus for precise measurement of plural superposed layers of metal.

An additional object of the invention is to provide a method and apparatus which is adapted for rapidly measuring the thickness of an overlay material on a base metal.

In the accomplishment of these objects, a metal instrument is disposed in engagement with the surface of the workpiece and is displaced through the material, the thickness which is to be measured, until a contact potential indicative of engagement with a base metal is detected. A thermocouple circuit may be utilized for sensing the contact potential and the displacement of the instrument is measured to obtain the thickness measurement.

A more complete understanding of the invention may be had from the detailed description which follows taken from the accompanying drawings in which.

It is well known that the surface engagement of two different metals causes a difference of electric potential between the metals. This electric potential is known as the contact potential and its magnitude depends upon the metals used and the temperature of the junction of the metals. In accordance with this invention, a change of contact potential is utilized to signify the engagement of a metal instrument with a selected metal surface or interface of a workpiece. The development of or change of contact potential is detected by forming a thermocouple circuit which includes the metal instrument and the base metal of the workpiece as one thermocouple junction and a circuit connection to another portion of the base metal as the other thermocouple junction. It is known, of course, that the thermal electromotive force developed in a thermocouple circuit depends upon the metals used and the temperature difference of the junctions.

Figure 1:
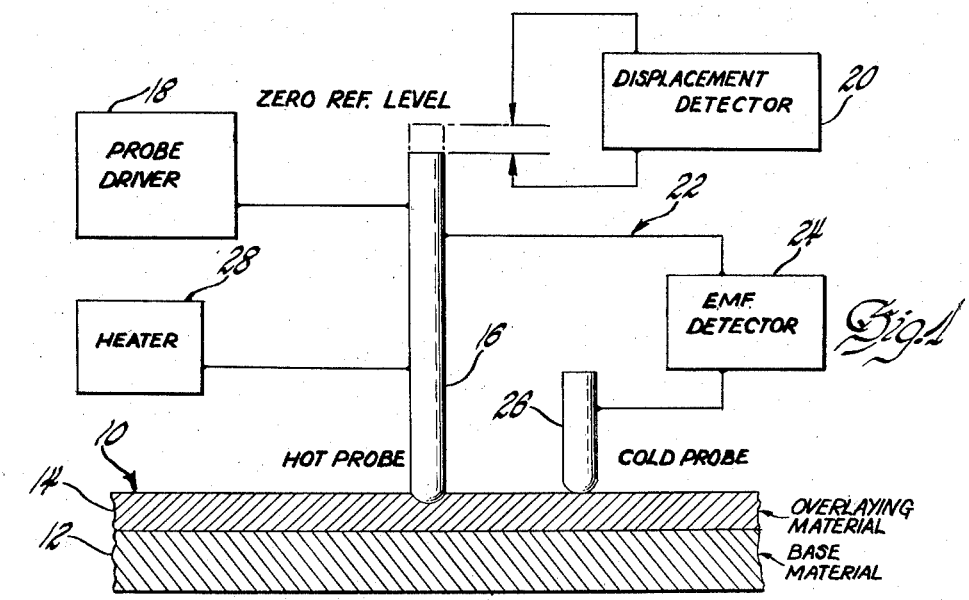
Figure 1 is a diagrammatic illustration of the inventive apparatus.

Referring now to Figure 1, there is illustrated in diagrammatic fashion one form of apparatus suitable for practice of the invention. The workpiece 10, of laminated construction, comprises a base material 12 of one metal and an overlay material 14 of another metal. The laminated workpiece is illustrated with only two layers for simplicity of explanation but may comprise multiple layers of different materials. The present invention is adapted for thickness measurement of any selected layer as will become apparent from the description which follows. The thickness of the overlay material 14 is greatly exaggerated in the drawings for explanatory purposes and may actually have a thickness in the range of a few ten thousandths of an inch although it will be apparent that the invention is suitable for application to bodies of greater thickness.

The apparatus comprises an instrument or measuring probe 16 constructed of metal and adapted to be displaced through the overlay material 14. For this purpose it may be of needle-like construction having a pointed lower end to facilitate penetration of the overlay material and to minimize the disturbance of the surface of the overlay material. Displacement of the probe 16 in a direction normal to the surface of the overlay material 14 is effected by a drive mechanism or probe driver 18 which is adapted to exert sufficient mechanical force on the probe 16 to cause penetration. The displacement of the probe 16 from a reference position is measured by a displacement detector 20, suitably a gauge type instrument, to provide direct measurement. The reference position of the probe is preferably selected at the threshold of surface engagement thereof with the material 14. A thermocouple circuit 22 is provided, which includes, in series connection, the probe 16, an electromotive force detector 24, and a conductive contact or probe 26. The thermocouple circuit is completed through the workpiece 10 by junctions therewith of the probe 16 and the probe 26 which may be termed the sensing and reference junctions, respectively. The probe 16 is maintained at a temperature greater than ambient temperature by a heater 28 to maintain the two junctions at different temperatures. The detector 24 may suitably take the form of a galvanometer type instrument for providing either a meter indication or a recorded indication of the value of the thermal electromotive force developed in the thermocouple circuit.

The manner of obtaining a thickness measurement in accordance with this invention will be described with reference to Figure 1. It may be assumed for illustration that the workpiece 10 is constructed of a base material 12 such as steel and the overlay material 14 such as babbitt. In preparation for effecting the measurement, the probe 26 is electrically connected with the workpiece 10 to establish a reference junction and the heater 28 is energized to maintain the probe 16 at a temperature value greater than that of the reference junction. The probe 16 is adjusted in position relative to the workpiece 10 to establish surface engagement with the overlay metal 14 to form a sensing junction in the thermocouple circuit. The proper position, for accuracy of measurement, is at the threshold of engagement of probe 16 and overlay metal which is signified by the development of a contact potential therebetween as indicated by the electromotive force detector 24. The indicator element of the displacement detector 20 is preferably adjusted to provide a reference indication, such as zero, and the probe driver 18 is energized. The probe driver displaces the probe 16 through the overlay metal 14 to the threshold of engagement between the probe 16 and the base metal 12. This event is signified by the development of a different contact potential at the sensing junction and a correspondingly different thermal electromotive force in the thermocouple circuit, as indicated by the detector 24. The displacement of the probe from the reference position, as indicated by the displacement detector 20, is a precise measure of the thickness of the overlay metal 14. At this point the penetration of probe 16 may be terminated or if the workpiece is formed of multiple layers, the penetration may be continued to obtain thickness measurements of succeeding layers in the same manner.

The method and apparatus may also be applied to the thickness measurement of insulating or semi-conductor materials, as well as conductors. The base material, which supports the overlay material being measured, must be such that a change of contact potential is developed by engagement with the measuring probe. For example, with a metal overlay, the probe and base may be the same or different metals; with an insulating overlay, the probe and base should be of different metals.

Figure 2:
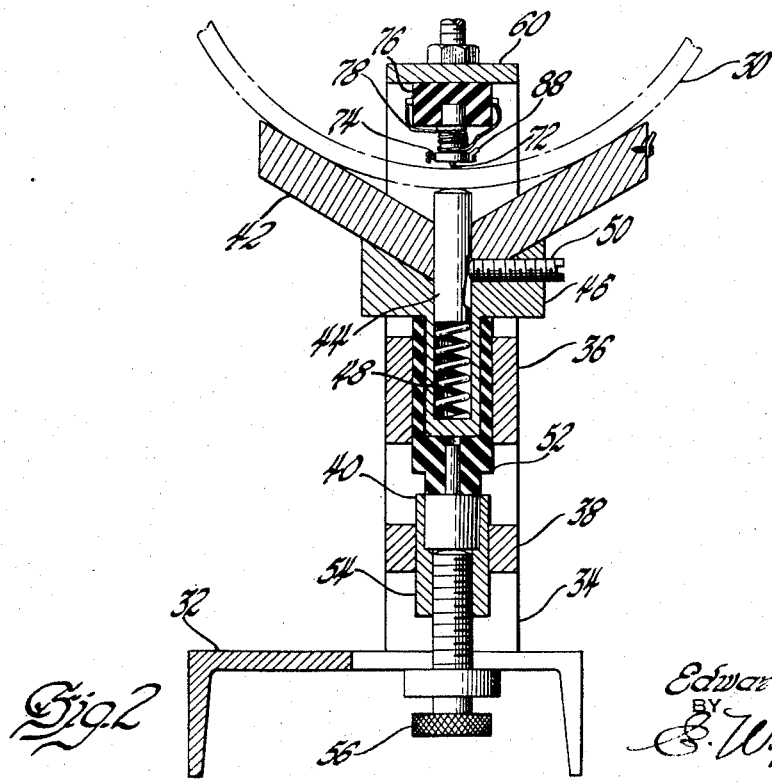
Figure 2 is an elevation view in section of one portion of an illustrative embodiment of the inventive apparatus.
Figure 3:
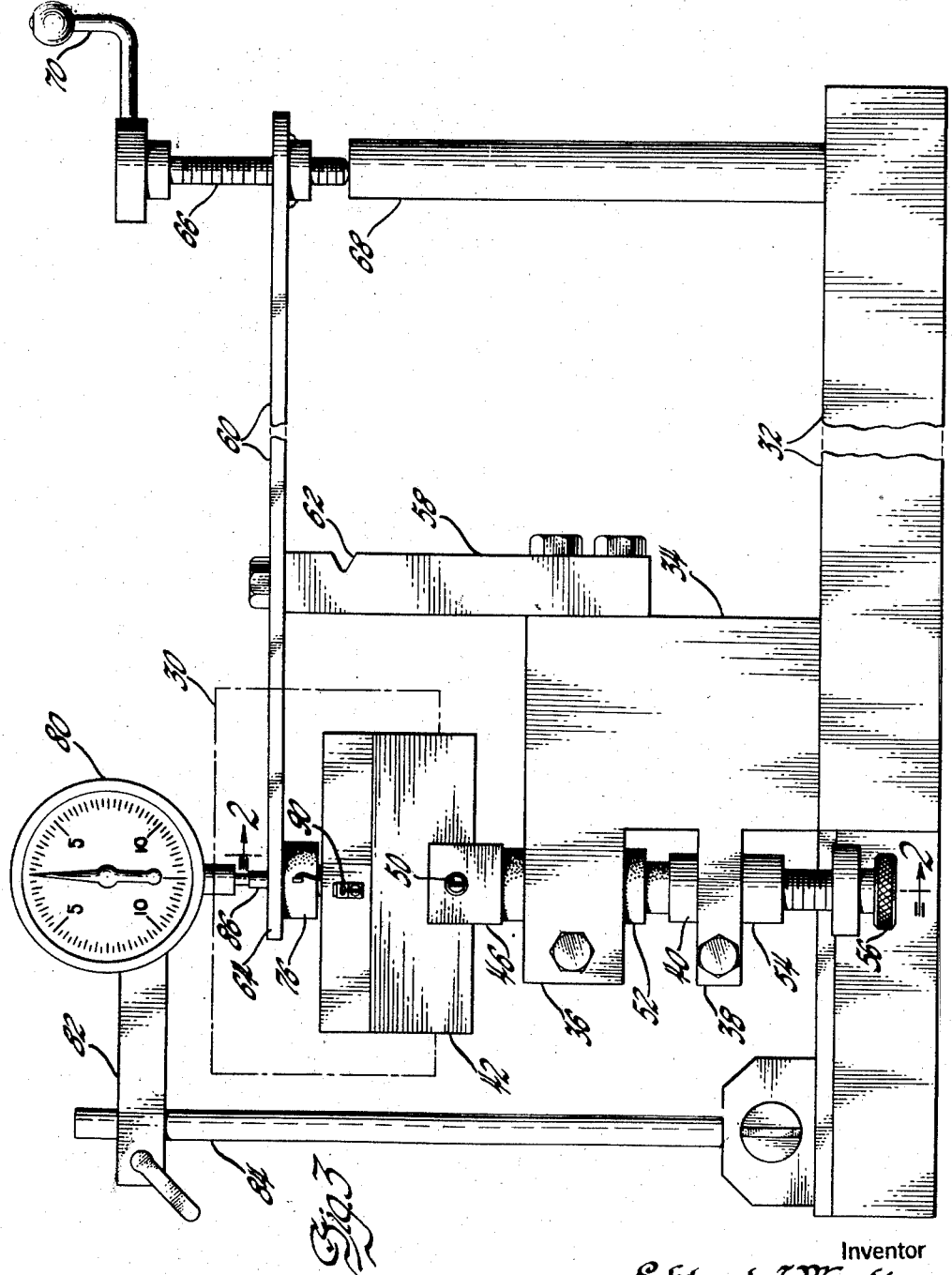
Figure 3 is an elevation view of the apparatus shown in Figure 2.

In Figures 2 and 3, there is shown an illustrative embodiment of the inventive apparatus for measuring the thickness of overlay metals on a semi-cylindrical segment of a workpiece or bearing 30. The apparatus comprises a support member or base 32 of channel shaped configuration upon which is disposed a mounting member or block 34. The mounting block 34 is provided with a pair of vertically spaced bifurcated brackets 36 and 38 which support an elevating mechanism 40 for the workpiece holder 42. The workpiece holder 42 is preferably of V-shape in cross-section and includes a centrally located support plunger 44 adapted to engage the workpiece to prevent deflection thereof during the measuring operation. The holder 42 is mounted on a movable block 46 within which the plunger 44 is seated against a coil spring 48 and may be locked in an adjusted position by a set screw 50 The movable block 46 is seated upon the movable plunger 52 of the elevating mechanism 40. The plunger 52 is constructed of insulating material and is slidably disposed in the bracket 36. The vertical position of the movable plunger 52, and hence the workpiece holder 42, is adjustable by means of a suitable elevation screw, such as differential or micrometer screw device 54, which is supported in bracket 38. A knob 56 is provided on the screw device 54 for manual manipulation to obtain precise vertical positioning of the workpiece holder 42.

A driving mechanism for the measuring probe comprises a support column 58 and a rigidly connected crossarm or lever 60 mounted on the block 34. The column 58 is adapted for transverse flexure, suitably by provision of a portion of reduced cross section 62 therein, to permit the lever 60 to be displaced at its free end 64 in a vertical plane. Controlled vertical motion is imparted to the free end 64 by an actuating screw 66 in threaded engagement with the other end of lever 60. The screw 66 is seated against an abutment 68 and is provided with a manually operable crank 70.

At the free end 64 of the lever 60 is mounted the measuring probe 72, preferably of needle-like construction, in a probe holder 74 which is connected by an insulating body 76 to the lever 60. The probe holder 74 is preferably constructed of a metal body of relatively high heat capacity, such as brass. An electrical resistance heating coil 78 is disposed on the probe holder for maintaining the holder and probe at a temperature greater than ambient temperature.

A displacement detector, suitably a dial indicator 80, is supported by a bracket 82 and post 84 from the base 32. The operating plunger 86 of the dial indicator engages the free end 64 of the lever 60 in vertical alignment with the probe 72 for sensing the vertical displacement of the probe to provide an indication of the thickness of the part being measured.

A thermocouple circuit (not shown in Figures 2 and 3) may be completed by electrical connection of a galvanometer type instrument between the measuring probe 72 and the workpiece holder 42. For this purpose, an electrical terminal 88 is provided on the probe holder 74 and similar terminal 90 is provided on the workpiece holder 42.

In operation of the apparatus of Figures 2 and 3, the workpiece 30 is disposed in the holder 42 and plunger 44 is locked in position by set screw 50. The dial indicator 80 may be set to zero indication and the elevation mechanism 40 is manipulated to position the workpiece in engagement with the measuring probe 72. The point of engagement will be signified by the indication of a thermal electromotive force in the thermocouple circuit by the galvanometer instrument. The measuring probe 72 is maintained at an elevated temperature by the energized heating coil 78 and thus the sensing junction of the probe 72 and workpiece and the reference junction formed by the workholder 42 and workpiece are at different temperatures. At this point, it may be desirable to reset the dial indicator to the zero position to correct for any disturbance. The probe 72 is caused to penetrate the overlay metal of the workpiece by rotation of the actuating screw 66 in a direction to force the free end 64 of lever 60 downwardly. The penetration is continued until a change of thermal electromotive force is indicated by the galvanometer instrument, signifying engagement of the measuring probe 72 with the base metal. Upon the occurrence of this event, the thickness of the overlay metal is presented by the reading of the dial indicator 80.

Although the description of this invention has been given with respect to a particular embodiment, it is not to be construed in a limiting sense upon the scope of the invention. Many variations and modifications within the spirit and scope of the invention will now occur to those skilled in the art. For a definition of the invention, reference is made to the appended claims.

I claim:

1. The method of measuring the thickness of an overlay material on a base metal comprising the steps of disposing a metal instrument in engagement with the surface of the overlay material, displacing the instrument through said overlay material, detecting the change of contact potential developed by engagement of the instrument and base metal, and measuring the displacement of the instrument.

2. The method of measuring the thickness of a body disposed with one surface in engagement with a metal member comprising the steps of disposing a metal instrument in engagement with the other surface of the body, providing an electric circuit between the instrument and the metal member, maintaining the instrument at a temperature different from that of the junction of the metal member and electric circuit, displacing the instrument through the body until a thermal electromotive force is developed in the circuit indicative of engagement of the instrument with the metal member, and measuring the displacement of the instrument.

3. The method of measuring the thickness of an overlay metal on a base metal comprising the steps of disposing a metal instrument in engagement with the overlay metal to develop a contact potential, displacing said instrument through the overlay metal into engagement with the base metal to develop a different contact potential, detecting the change of contact potential, and measuring the displacement of said instrument.

4. The method of measuring the thickness of a body of metal comprising the steps of disposing said body on a base of metal different from that of the body, disposing a metal instrument in engagement with one surface of the body to form a first thermoelectric junction, connecting an electrical circuit including a second thermoelectric junction between the instrument and said body, maintaining said junctions at different temperatures, displacing said instrument through said body until a change of thermal electromotive force is developed in said circuit signifying engagement of the instrument with the base, and measuring the displacement of said instrument.

5. The method of measuring the thickness of an overlay metal on a base metal comprising the steps of forming an electric circuit which includes the overlay metal, maintaining the junctions of the overlay metal in said circuit at different temperatures, displacing one junction forming element of said circuit through the overlay metal until a change of thermal electromotive force is developed in said circuit signifying engagement of the element with the base metal, and measuring the displacement of said one junction forming element.

6. Apparatus for measuring the thickness of an overlay material on a base metal comprising a metal instrument, an electric circuit connecting the instrument to the base metal, means for displacing the instrument from surface engagement with the overlay material through the overlay material into engagement with the base metal, electromotive force responsive means, means in said circuit for detecting the development of a contact potential by engagement of the instrument and the base metal, and means for measuring the displacement of the instrument.

7. Apparatus for measuring the thickness of an overlay metal on a base metal comprising a metal instrument, an electric circuit connecting the instrument to the base metal, means for maintaining the temperature of the instrument different from the temperature of the junction of the base metal and circuit, means for displacing the instrument from surface engagement with the overlay metal into engagement with the base metal, means in said circuit for detecting a change of the thermal electromotive force developed in the circuit, and means for measuring the displacement of the instrument.

8. Apparatus for measuring the thickness of an overlay metal on a base metal comprising a metal instrument, an electric circuit connecting the instrument to the base metal, means in said circuit for indicating an electromotive force therein, means for maintaining the temperature of the instrument different from that of the junction of the base metal and circuit, means for adjusting the instrument and the overlay metal into surface contact as signified by a thermal electromotive force in the circuit, means for displacing the instrument through the overlay metal into surface contact with the base metal as signified by a different thermal electromotive force in the circuit, and means for measuring the displacement of the instrument.

9. Apparatus for measuring the thickness of an overlay metal on a different base metal comprising a metal probe, an electric circuit connecting the metal probe to the base metal, means for detecting an electromotive force in said circuit, means for heating said probe to greater than ambient temperature whereby a temperature difference is maintained between the probe and the junction of the base metal with the circuit, means for adjusting the probe and overlay material into surface contact whereby an electromotive force of one value is developed in the circuit, means for forcing the probe to penetrate the thickness of the overlay material into engagement with the base metal whereby an electromotive force of another value is developed in the circuit, and means for measuring the displacement of the probe.

10. Apparatus for measuring the thickness of an overlay metal on a workpiece of different base metal comprising a metal support member for the workpiece, a metal probe, electrical resistance heating means adjacent the probe for maintaining the probe temperature above ambient temperature, circuit means interposed between the probe and the support member to form an ambient temperature junction with the base metal, means for detecting an electromotive force in said circuit, an elevating mechanism on the support member for adjusting the probe and overlay metal into surface contact whereby an electromotive force of one value is developed in the circuit, means for forcing the probe to penetrate the thickness of the overlay material into engagement with the base metal whereby an electromotive force of another value is developed in the circuit, and means for measuring the displacement of the probe.

References Cited in the file of this patent

UNITED STATES PATENTS

| | | |
|---|---|---|
| 2,567,333 | Gogan | Sept. 11, 1951 |
| 2,763,935 | Whaley et al. | Sept. 25, 1956 |